(12) United States Patent
Woodruff

(10) Patent No.: US 10,018,830 B1
(45) Date of Patent: Jul. 10, 2018

(54) HIGH DAMAGE THRESHOLD BROADBAND LASER SHUTTER

(71) Applicant: Dachwood Physik, Inc., San Jose, CA (US)

(72) Inventor: David C. Woodruff, Cupertino, CA (US)

(73) Assignee: DACHWOOD PHYSIK, INC., San Jose, CA (US)

( * ) Notice: Subject to any disclaimer, the term of this patent is extended or adjusted under 35 U.S.C. 154(b) by 654 days.

(21) Appl. No.: 14/617,739

(22) Filed: Feb. 9, 2015

(51) Int. Cl.
*G02B 26/02* (2006.01)
*G02B 5/00* (2006.01)
*C23C 14/34* (2006.01)

(52) U.S. Cl.
CPC ............. *G02B 26/02* (2013.01); *G02B 5/003* (2013.01); *C23C 14/34* (2013.01)

(58) Field of Classification Search
CPC ...... G02B 26/02; G02B 5/005; G02B 5/0278; G02B 5/003; G02B 27/0018; H01S 3/005; H01S 3/21; H01S 3/086; H01S 5/005; C23C 14/34; C23C 14/3414; C03C 17/36
USPC .... 359/227, 230, 233, 234, 601, 614; 372/9, 372/14, 107, 108; 204/192.1, 192.15, 204/192.26, 192.27, 192.28
See application file for complete search history.

(56) References Cited

U.S. PATENT DOCUMENTS

| | | | |
|---|---|---|---|
| 4,614,050 A * | 9/1986 | Stevens | F41G 11/001 359/507 |
| 4,712,609 A * | 12/1987 | Iversen | H01L 23/473 165/133 |
| 4,799,767 A | 1/1989 | Woodruff | |
| 4,827,084 A * | 5/1989 | Yaniv | G06F 3/033 101/485 |
| 4,946,256 A | 8/1990 | Woodruff | |
| 5,032,005 A | 7/1991 | Woodruff | |
| 5,596,590 A * | 1/1997 | de Ruyter | G02B 26/04 372/107 |
| 6,493,364 B1 * | 12/2002 | Baumler | H01S 3/03 372/107 |
| 8,542,424 B2 | 9/2013 | Abe et al. | |

(Continued)

OTHER PUBLICATIONS

Huang et al "Graphite-like carbon films by high power impulse magnetron sputtering", Applied Surface Science 283 (2013), p. 321-326.*

(Continued)

*Primary Examiner* — Jie Lei

(74) *Attorney, Agent, or Firm* — Thomas Schneck

(57) ABSTRACT

A high-damage-threshold broadband laser shutter includes a black diamond absorber plate having a specified density of graphite (sp2) dopant dispersed therein to provide a selected amount of bulk optical absorbance of any incident beam. A heat sink block having a channel therein provides a laser light path to an exit aperture and further has a hard sliding interface on an exit surface thereof. A ferromagnetic frame holds the black diamond absorber plate in a slideable relation against the hard sliding interface of the heat sink block between a first position wherein the diamond absorber plate blocks the light aperture and a second position wherein the diamond absorber plate is located away from the light aperture. Electromagnetic means slide the frame together with the black diamond absorber plate between the first and second positions.

14 Claims, 4 Drawing Sheets

(56) References Cited

U.S. PATENT DOCUMENTS

2011/0164297 A1    7/2011   Abe et al.

OTHER PUBLICATIONS

J.E. Graebner et al., "The thermal conductivity of chemical-vapor-deposited diamond films on silicon", J. Appl. Phys. 71 (7), Apr. 1, 1992, pp. 3143-3146.
E.P. Visser et al., Measurement of thermal diffusion in thin films using a modulated laser technique: Applicant to chemical-vapor-deposited diamond time, J. Appln. Phys. 71 (7), Apr. 1, 1992, pp. 3238-3246.

* cited by examiner

HIGH DAMAGE THRESHOLD BROADBAND LASER SHUTTER

TECHNICAL FIELD

The present invention relates to laser shutters, especially those adapted for high intensity pulsed laser beams.

BACKGROUND ART

Prior laser shutter designs have used moving reflective mirrors to redirect the beam to an absorbing region. Moving mirrors deflect beams to a geometrical surface morphology and atomic absorption centers. This works well at low irradiance and low fluence (energy density, $J/cm^2$), but requires highly sophisticated and expensive mirrors tailored for individual wavelengths. Moreover, as the power increases, pulse width time shortens, or beam diameter is reduced, the mirrors cannot provide high laser induced damage threshold (LIDT) for broadband use. Hence, many wavelength-specific mirrors must be used for various applications. Additionally, any contamination present on the mirror surface can generate a catastrophic failure.

Moving mirrors need extreme mechanical mounting protection for fracture safety. Most mechanical movement systems use bearings with only point or line contact, not surface contact, so there is virtually no heat flow. Flexure systems have no significant thermal cross-section.

Water-cooled (umbilical) pucks with ceramic (SiC, AlN) coating have been used for optical absorption. Large volume, doped glasses have limited absorption times due to heat build-up. Very intense laser light sources would quickly obliterate any glass or absorbing film structure. Additionally, sacrificial surfaces can contaminate via particles and outgassing.

Desired properties of a laser shutter adapted for high intensity laser pulses include a broadband range of operation so that one device works with most or all of the available laser wavelengths (typically 150-11000 nm) and avoid needless specificity. The shutter should be able to handle high irradiance (pulsed or cw; 1 mm diameter or smaller beams) without limitations on exposure to the beam, and have very high laser induced damage threshold (LIDT), so that the shuttered beam produces no contamination or any drill-through of the device material and no material is liberated from the shutter device. The shutter should be able to manage the heat load (typically in 50-100 W range), so the unit will be largely insensitive to any surface contamination films. It should not outgas and be bakeable to remove organics, i.e. eliminate or limit polymers. There should be no back reflection and minimized backscatter to the laser source. The failsafe is a closed state and there should be no leakage of the beam energy when closed. The shutter needs to remove heat and still have a moving element, with low shock and vibration when moving between open and closed positions. A small package and simple electronic drive, as well as commercially-available components and low cost are preferred and there should be no extreme supplier constraints.

SUMMARY DISCLOSURE

A high irradiance, high laser induced damage threshold (LIDT) shutter for a laser with broadband wavelength absorption range is provided, using advanced crystalline materials, ceramic, metals and limited high-temperature polymers to enable its function. The moving element in and out of the beam performs an absorbing function, rather than a reflection function. That is mirrors are eliminated by choosing a material that absorbs light, then diffuses and conducts heat out to a conventional high thermal conductivity (such as copper) body.

The enabling element is one or more volume absorber plates, approx. 0.5 to 2 mm thick, composed of chemical vapor deposition (CVD) diamond doped with graphite (sp2). The sp2 graphite absorbs the laser energy from UV to IR. The level of sp2 doping controls the rate of absorption as the beam enters the crystal, providing an exponential decay of the beam and conversion to heat. One can dope to the absorption level needed, or use a stack of absorbing diamond substrates for a more gradual absorption rate. The sp3 crystal structure of CVD diamond provides unmatched thermal conductivity to remove the heat. The CVD diamond absorber is capable of surviving high power, short duration (ns, ps, fs) laser pulses, as well as long-term high wattage continuous beams, without overheating or incurring surface damage. Geometric considerations accommodate unavoidable, but minor (typ. <20% of overall beam power) surface reflections, wherein Fresnel reflection of the beam from the front surface is managed in a pocket with surface absorbers (or possibly more diamond volume absorber plates).

The invention takes advantage of naturally extremely low coefficient of friction of CVD diamond (sp3) to provide sliding between open and closed shutter positions. One can simply polish one side of the diamond absorber plate and let this polished diamond surface slide against a flat, polished, hard contact surface of high thermal conductivity (e.g., silicon carbide or diamond substrate mechanically mounted or deposition bonded to conventional copper body) to provide both low friction and high thermal transfer interface. The sp2-doped diamond absorbs the laser light, converting it to heat, and quickly channels the heat out through the sliding interface so as to maintain a reasonably low operating temperature and without generating temperature gradients in the air inside the shutter that would cause thermal lensing through the air path A (ferro)-magnetic puck (Fe) is used to move the sp3 crystal back and forth via an electromagnet, providing a quiet sliding movement. A simple wire contact system, having a moving wire attached to the puck between fixed contacts, can provide positive position feedback of the moving crystal. Spring systems keep the puck in the normally closed position. A moving absorber, rather than a mirror, makes the shutter unsusceptible to catastrophic contamination issues—the laser will absorb on contaminants as well as the diamond, and the absorber's sliding contact surface will transfer the heat to maintain a low operating temperature. The shutter is bakeable (200° C.+) for organics film removal. An all crystal, ceramic, metal and high-temperature polyamide polymer allow cleanroom assembly and high temperature bakeout for use in ultraclean operations of laser systems. For even higher bakeout or operating temperature, the polyamide coating on the magnet wire (the temperature limiting element) can be replaced by a ceramic coated magnet wire.

A convergence of multiple advantageous physical properties of sp2-doped diamond allows this shutter to meet the stated requirements for use with high intensity laser pulses. The broadband optical absorption by sp2-doping allows one commercially produced device to cover all wavelengths. CVD diamond has high laser induced damage threshold (LIDT), and high thermal shock resistance. The latter is important for accommodating very short (ns, ps, fs) laser pulses with high energy, so that the absorber plate does not fracture. CVD diamond is also a high temperature material that can handle local heat and bakeable heat without any concerns. It has low thermal expansion, so that stresses in material are minimized and there are no special mounting requirements. Diamond's three times better thermal conductivity than the best metal (copper) allows lower local temperature and faster heat diffusion transfer and thereby allows higher optical loads. Diamond is characterized by a high chemical inertness so that intense electric fields from the laser pulses at the incident surface do not cause reactions of $N_2$, $O_2$, or $H_2O$ (air) with the diamond material.

Diamond's extremely low coefficient of friction permits sliding on other hard materials, such as SiC or diamond films. The diamond surface is polishable. As the hardest known material, it minimizes wear and particulate generation, so that the polish holds its surface plane virtually forever. Diamond is also a very stiff crystalline material, so that the sliding contact surface does not bow or deflect to maintain full engagement of heat transfer interface.

DETAILED DESCRIPTION

Diamond CVD substrates with sp2 graphite are currently manufactured for use as heat sinks for electronics, but never before used as absorbing optics. Diamond CVD substrates (with zero or minimal sp2) are used in optics applications for highly transmissive windows.

Pure diamond has 100% face centered cubic (fcc) crystal structure and is transparent—all sp3 bonds are complete. CVD processes to grow optical grade transparent diamond for maximum transmission require more time and tighter control; but as commercial industry pushes to produce CVD diamond at higher throughput rates, some of the sp3 bonds do not fully develop in the fcc structure and some sp2 graphite grows uniformly throughout at the microcrystal interfaces that make up the solid polycrystalline diamond; allowing for several grades of optical clarity permits the industry to squeeze out more diamond with some small amount of graphite impurity.

The thermal heat sink market is not interested in optical clarity, just thermal conductivity balanced with cost. Pure diamond has maximum thermal conductivity ($\approx$2000 W/m-K), but the graphite is still a great thermal conductor (in planar form, not in all 3 axes), so we do not sacrifice much thermal conductivity with some graphite "doping" present in the CVD diamond. The lower thermal conductivity is used as a measure of the graphite concentration with manufacturers offering 2 or 3 heat sink grades (1000 to 1500 W/m-K).

The present invention recognizes for the first time that the heat sink grades of CVD diamond can also be used as a high thermal conductivity broadband bulk optical absorber in laser shutters. Because the sp2 graphite present in the heat sink grades of CVD diamond are highly absorptive throughout the entire working laser range of 190 nm to 11000 nm (UV to mid-IR) and the electric field of the incident laser beam is gradually attenuated by small atomic planes of graphite as it passes through the small diamond crystal interfaces of the polycrystalline material, we can gradually attenuate extremely high intensity laser pulses through a solid bulk absorber without vaporizing or explosively ablating surface material from the CVD diamond.

Currently available heat sink grades of CVD diamond correspond to approximately 0.5% to 20% transmission through a 0.5 mm thick crystal. For low energy laser pulses, we can absorb quickly with one 0.5% transmission crystal. Extreme pulse energies are accommodated with a longer path through 2 or more stacked crystal absorbers having a lower absorption rate (e.g., 20% transmission crystals). Lower cost materials, such as SiC, can be provided behind the main diamond absorber(s) in front, allowing one to tailor price versus performance to specific applications.

Figure 1:
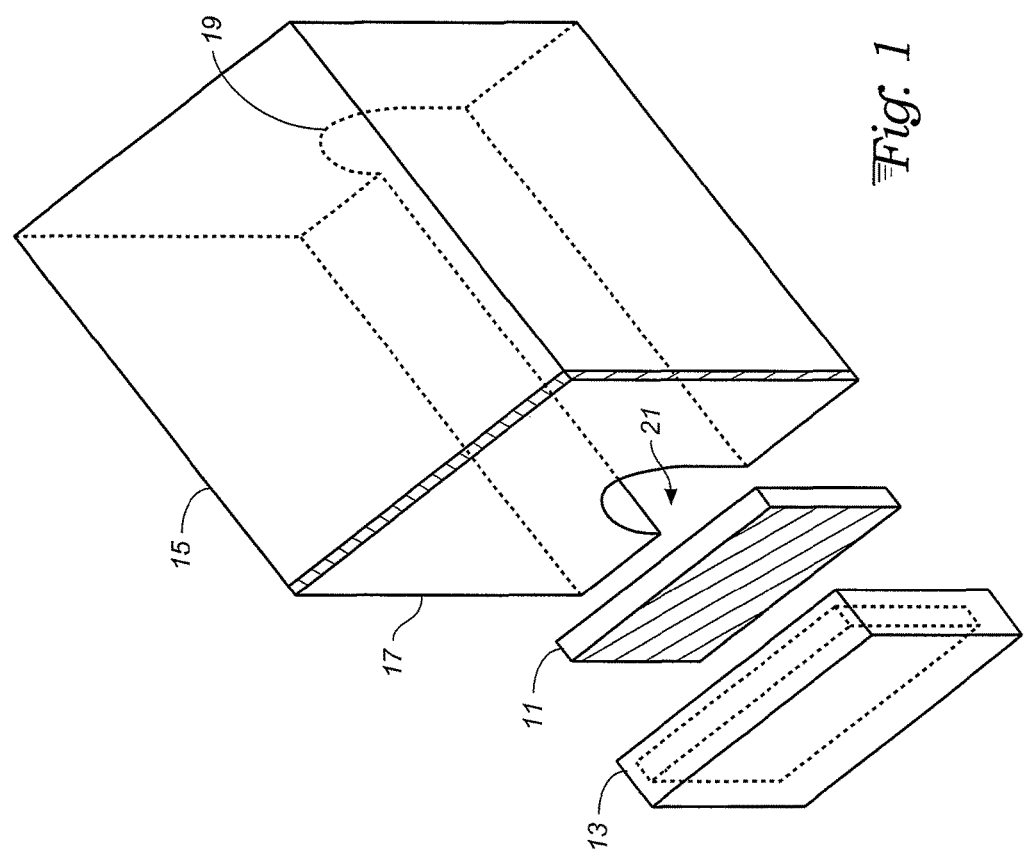
FIG. 1 is a perspective view illustrating the black diamond absorber plate, heat sink block with sliding interface, and ferromagnetic frame of a simplified laser shutter embodiment in accord with the present invention.

With reference to FIG. 1, a high-damage-threshold broadband laser shutter includes a black diamond absorber plate 11 having a specified density of graphite (sp2) dopant dispersed uniformly throughout the bulk CVD diamond material. The concentration level of graphite dopant is selected to provide a specified amount of bulk optical absorbance of any incident beam. For example, the CVD diamond may have at least a 1% density of graphite dopant to produce about 20% transmission through 0.5 mm of diamond crystal. Higher concentrations of graphite could also be used for even higher absorption and lower transmission, e.g. just 0.5% transmission through 0.5 mm of the crystal plate. Also, instead of just one absorber plate 11, there can be a stack of multiple CVD diamond plates.

The absorber plate 11 (or stack of plates) is held within a ferromagnetic frame 13 (e.g. of iron) moveable by an electromagnet (not shown) so that the plate(s) 11 slides against a face of heat sink block 15 between open and closed positions. The heat sink block 15 may be made of copper or other high conductivity metal or ceramic material. The heat sink block 15 may in turn be mounted to a larger heat sink. A hard polished planar substrate 17, such as of silicon carbide or even another CVD diamond plate, may be attached as a wear-resistant, low friction interface of high thermal transfer, against which the diamond plate 11 can slide, transversely either up-and-down or side-to-side, between open and close shutter positions. The heat sink block 15 is seen to have a channel 19 (or tunnel) providing a light path for a laser beam terminating in an exit aperture 21 adjacent to the absorber plate 11. For fail-safe operation, the default position is closed blocking the exit aperture 21 and positive electromagnetic action is needed to slide the plate 11 and frame 13 to its open shutter position to expose the exit aperture 21.

Figure 2:
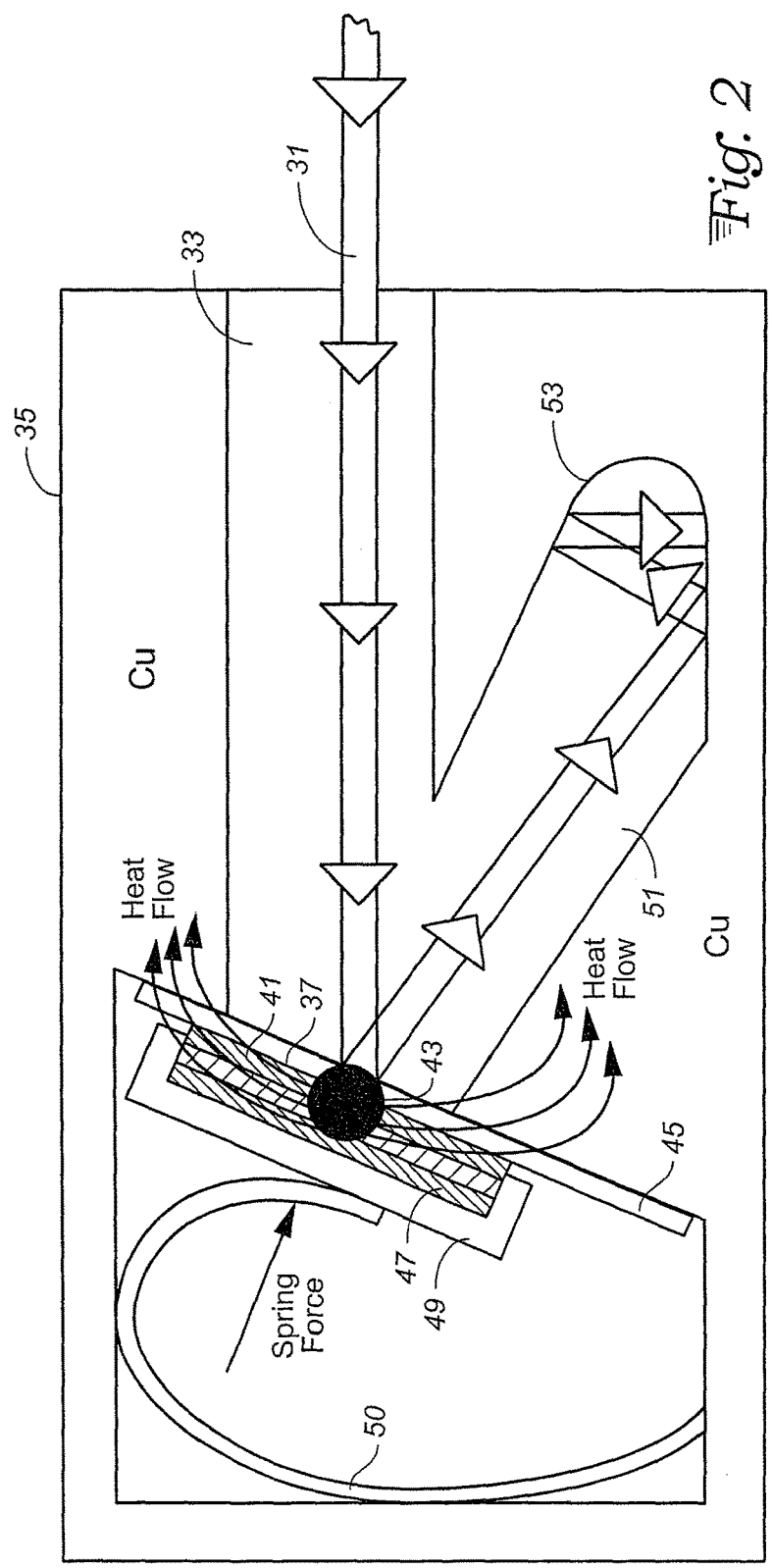
FIG. 2 is a plan view of a laser embodiment in accord with the present invention illustrating contact heat flow and handling of any Fresnel reflection from the incident absorber plate surface.

With reference to FIG. 2, a laser beam 31 travels along a light path through a channel or tunnel 33 of a heat sink block 35 to an exit aperture 37, shown here as blocked by a CVD diamond absorber plate 41 in its closed shutter position. (In the open shutter position, the absorber plate 41 would be moved out of the way of the exit aperture 37, allowing the laser beam 31 to pass out of the shutter.) In its closed position, the absorber plate 41 absorbs the laser beam energy, converting it to heat 43, which is in turn transferred via the sliding contact interface 45 to bulk heat sink block 35.

The absorber plate 41 is contained, possibly backed by silicon carbide 47, within a ferromagnetic puck or frame 49. The entire slidable unit of absorber plate(s), any backing plate material 47, and frame 49 is held by spring force (e.g. with a leaf spring 50) against the sliding contact interface 45.

Also seen in the embodiment of FIG. 2 is an alternate pathway 51 in the heat sink block 35 for any residual Fresnel reflection (generally less than 20% of the total power) of the incident laser beam to a light trap region 53 with surface absorption characteristics. This keeps any back reflections of the light from returning through the channel 33 to the laser source.

Figure 3:
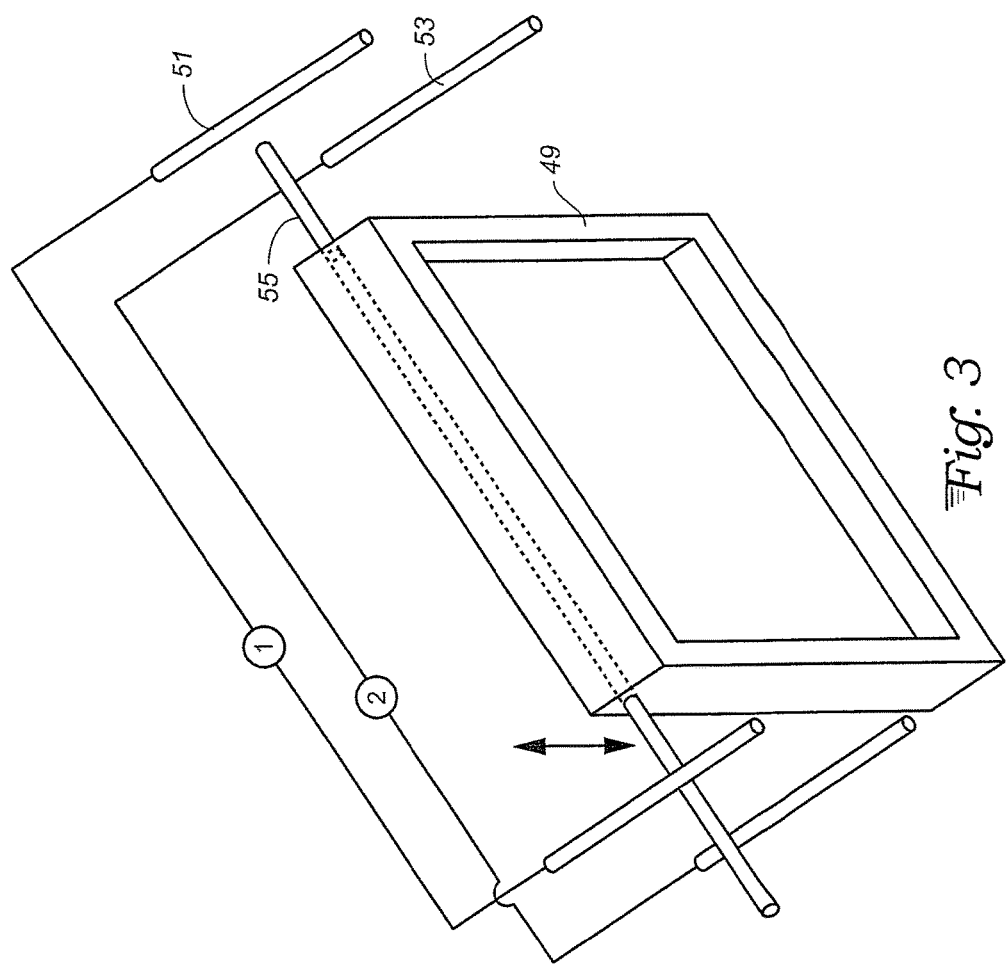
FIG. 3 is a schematic perspective view showing a moving wire between fixed contacts for position feedback of the moving puck.
Figure 4:
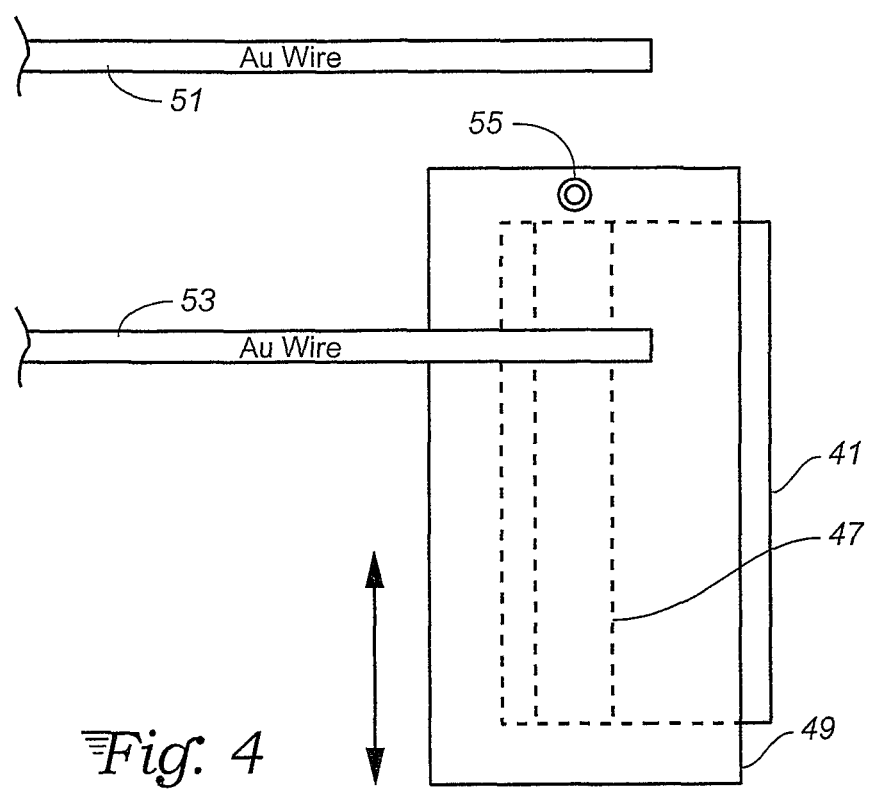
FIG. 4 is a side plan view of the wire contact system of FIG. 3.

With reference to FIGS. 3 and 4, positive position feedback of the shutter's frame or puck 49 may be provided by a simple wire contact sensor system. Two fixed wires 51 and 53 are located so as to contact a moving wire 55 at the extreme open and closed shutter positions of the frame 49. The wires may be gold plated spring steel wire and are insulated from the ferromagnetic frame 47. The contact of wire 55 with either of the fixed wires 51 or 53 close an electrical circuit, producing sensor signals that can be interpreted by associated electronics.

What is claimed is:

1. A high-damage-threshold broadband laser shutter, comprising:
   a black diamond absorber plate of at least 0.5 mm thickness having a specified density of graphite ($sp^2$) dopant dispersed therein to provide a selected amount of bulk optical absorbance of any incident beam, the black diamond absorber characterized by 0.5% to 20% transmittance per 0.5 mm thickness over a wavelength range of 190 nm to 11000 nm;
   a heat sink block having a channel therein providing a laser light path to an exit aperture and further having a hard sliding interface on an exit surface thereof;
   a ferromagnetic frame holding the black diamond absorber plate in a slideable relation against the hard sliding interface of the heat sink block between a first position wherein the diamond absorber plate blocks the light aperture and a second position wherein the diamond absorber plate is located away from the light aperture; and
   electromagnetic means for sliding the frame together with the black diamond absorber plate between the first and second positions.

2. The laser shutter as in claim 1, wherein the hard sliding interface is composed of silicon carbide.

3. The laser shutter as in claim 1, wherein the black diamond absorber plate comprises a stack of multiple black diamond sheets.

4. The laser shutter as in claim 1, wherein the black diamond absorber has at least a 1% density of graphite dopant.

5. The laser shutter as in claim 1, wherein the hard sliding interface is mechanically attached to heat sink block adjacent to the light aperture.

6. The laser shutter as in claim 5, wherein the sliding interface is composed of material selected from silicon carbon or diamond.

7. The laser shutter as in claim 1, wherein the ferromagnetic frame has a surface depression or cavity in which the black diamond absorber is seated, the frame with its absorber being spring-loaded against the heat sink block.

8. The laser shutter as in claim 1, wherein the ferromagnetic frame is thermally conductive.

9. The laser shutter as in claim 1, wherein the black diamond absorber plate is oriented at a non-perpendicular angle in relation to the light aperture, the heat sink block further having an oblique reflection light path terminating in a light trap.

10. The laser shutter as in claim 9, wherein the light trap comprises an absorbing surface of the heat sink block.

11. The laser shutter as in claim 9, wherein the light trap comprises one or more black diamond absorbers positioned at an end of the oblique reflection light path.

12. The laser shutter as in claim 1, further having a position sensor system for the ferromagnetic frame and its black diamond absorber plate.

13. The laser shutter as in claim 12, wherein the position sensor system comprises a movable wire coupled to the electromagnetic frame and a pair fixed wires positioned to contact the movable wire at extreme open and closed shutter positions to complete a circuit.

14. A method of shuttering a high irradiance laser beam, comprising:
    directing a laser beam through a channel in a heat sink block toward an exit aperture; and
    sliding a ferromagnetic frame by electromagnetic means between a first position and a second position, the ferromagnetic frame holding a black diamond absorber plate of at least 0.5 mm thickness having a specified density of graphite ($sp^2$) dopant dispersed therein to provide a selected amount of bulk optical absorbance of any incident beam, the black diamond absorber characterized by 0.5% to 20% transmittance per 0.5 mm thickness over a wavelength range of 190 nm to 11000 nm, the black diamond absorber blocking the light aperture in the first position and being located away from the light aperture in the second position, heat generated from the light absorption being transferred from the black diamond absorber plate to the heat sink block.

* * * * *